(12) United States Patent
Condit et al.

(10) Patent No.: US 8,813,043 B2
(45) Date of Patent: Aug. 19, 2014

(54) UNIFYING TYPE CHECKING AND PROPERTY CHECKING FOR LOW LEVEL PROGRAMS

(75) Inventors: Jeremy P. Condit, Redmond, WA (US); Shaz Qadeer, Seattle, WA (US); Shuvendu K. Lahiri, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 962 days.

(21) Appl. No.: 12/347,398

(22) Filed: Dec. 31, 2008

(65) Prior Publication Data

US 2010/0169868 A1 Jul. 1, 2010

(51) Int. Cl.
*G06F 9/44* (2006.01)
*G06F 9/45* (2006.01)
*G06F 11/36* (2006.01)

(52) U.S. Cl.
CPC ............ *G06F 8/437* (2013.01); *G06F 11/3608* (2013.01); *G06F 8/40* (2013.01)
USPC .......................................... 717/136; 717/126

(58) Field of Classification Search
CPC ........ G06F 8/437; G06F 9/44589; G06F 9/44
USPC ....................................................... 717/136
See application file for complete search history.

(56) References Cited

U.S. PATENT DOCUMENTS

| | | | | |
|---|---|---|---|---|
| 5,596,682 A | * | 1/1997 | Yamazaki | 706/56 |
| 5,842,204 A | * | 11/1998 | Andrews et al. | 1/1 |
| 6,343,372 B1 | * | 1/2002 | Felty et al. | 717/136 |
| 6,560,774 B1 | * | 5/2003 | Gordon et al. | 717/146 |
| 7,810,086 B2 | * | 10/2010 | Murphy et al. | 717/159 |
| 2002/0046393 A1 | * | 4/2002 | Leino et al. | 717/7 |
| 2003/0126590 A1 | * | 7/2003 | Burrows et al. | 717/154 |
| 2006/0247907 A1 | | 11/2006 | Qadeer et al. | |
| 2006/0248519 A1 | | 11/2006 | Jaeger et al. | |
| 2007/0074152 A1 | | 3/2007 | Roe | |
| 2010/0192129 A1 | * | 7/2010 | Langworthy et al. | 717/126 |

OTHER PUBLICATIONS

"Neal Glew and Greg Morrisett"; "Type-Safe Linking and Modular Assembly Language";"1999";"ACM New York, NY, USA © 1999";"12 pages".*
"Mike et al";"Boogie: A Modular Reusable Verifier for Object-Oriented Programs";"2006";"24 pages".*
"David et al ";"Simplify: A Theorem Prover for Program Checking"; "2005";"109 pages".*

(Continued)

*Primary Examiner* — Anna Deng
*Assistant Examiner* — Brahim Bourzik
(74) *Attorney, Agent, or Firm* — Dan Choi; Carole Boelitz; Micky Minhas

(57) ABSTRACT

This document describes a unified type checker and property checker for a low level program's heap and its types. The type checker can use the full power of the property checker to express and verify subtle, program specific type and memory safety invariants well beyond what the native low level program system can check. Meanwhile, the property checker can rely on the type checker to provide structure and disambiguation for the program's heap, enabling more concise and more powerful type-based specifications. This approach makes use of a fully automated Satisfiability Modulo Theories (SMT) solver and a decision procedure for checking type safety, which means that the programmer's only duty is to provide high-level type and property annotations as part of the original program's source.

18 Claims, 3 Drawing Sheets

(56) References Cited

OTHER PUBLICATIONS

Shunak et al; "A Reachability Predicate for Analyzing Low-Level Software"; "2007"; "15 pages".*
"Filip et al"; "Theorem Provers Based on the Quantifier Elimination Method", "2003"; "4 pages".*
Ball, et al., "Annotation-Based Property Checking for Systems Software", retrieved on Sep. 22, 2008 at <<ftp://ftp.research.microsoft.com/pub/tr/TR-2008-82.pdf>>, Microsoft Research, Technical Report MSR-TR-2008-82, May 23, 2008, pp. 1-13.
Ball, et al., "Automatic Predicate Abstraction of C Programs", retrieved on Sep. 22, 2008 at <<http://www.cs.ucla.edu/~todd/research/pldi01.pdf>>, ACM Press, In Proc. ACM PLDI, 2001, pp. 1-11.
Barnett, et al., "Boogie: A Modular Reusable Verifier for Object-Oriented Programs", retrieved on Sep. 22, 2008 at <<http://research.microsoft.com/~leino/papers/krm1160.pdf>>, Microsoft Research, Formal Methods for Components and Objects: 4th International Symposium, FMCO 2005, vol. 4111 of Lecture Notes in Computer Science, pp. 1-24.
Barnett, et al., "The Spec# Programming System: An Overview", retrieved on Sep. 22, 2008 at <<http://research.microsoft.com/~leino/papers/krm1136.pdf>>, Manuscript KRML 136 (later CASSIS 2004 proceedings), Oct. 12, 2004, pp. 1-21.
Barnett, et al., "Weakest-Precondition of Unstructured Programs", retrieved on Sep. 22, 2008 at <<http://research.microsoft.com/~leino/papers/krm1157.pdf>>, Microsoft Research, ACM Press, PASTE '05: The 6th ACM SIGPLAN-SIGSOFT Workshop on Program Analysis for Software Tools and Engineering, 2005, pp. 82-87, 8 pgs.
Bohme, et al., "HOL-Boogie—An Interactive Prover for the Boogie Program-Verifier", retrieved on Sep. 22, 2008 at <<http://www-wjp.cs.uni-sb.de/publikationen/boehme_tphols_2008.pdf>>, Springer-Verlag, Lecture Notes in Computer Science, vol. 5170, Proceedings of the 21st International Conference on Theorem Proving in Higher Order Logics, 2008, pp. 150-168, 16pgs.
Calcagno, et al., "Beyond Reachability: Shape Abstraction in the Presence of Pointer Arithmetic", retrieved on Sep. 22, 2008 at <<http://www.springerlink.com/content/p12748j43u670403/fulltext.pdf>>, Springer-Verlag Berlin Heidelberg, In SAS, Aug. 18, 2006, pp. 182-203.
Chang, et al., "The Open Verifier Framework for Foundational Verifiers", retrieved on Sep. 22, 2008 at <<http://delivery.acm.org/10.1145/1050000/1040295/p1-chang.pdf?key1=1040295&key2=0928612221&coll=&dl=ACM&CFID=3695867&CFTOKEN=96236972>>, ACM, Proceedings of the 2005 ACM SIGPLAN International Workshop on Types in Languages Design and Implementation, 2005, 12 pgs.
Chatterjee, et al., "A Reachability Predicate for Analyzing Low-Level Software", retrieved on Sep. 22, 2008 at <<http://research.microsoft.com/~shuvendu/papers/havoc_tacas07.pdf>>, Microsoft Research, Springer Verlag, Tools and Algorithms for the Construction and Analysis of Systems, 2007, 15 pgs.
Chin, et al., "Semantic Type Qualifiers", retrieved on Sep. 22, 2008 at <<http://lever.cs.ucla.edu/shane/research/PLDI05.pdf>>, ACM, Proceedings of the 2005 ACM SIGPLAN Conference on Programming Language Design and Implementation, 2005, pp. 85-95, 10 pgs.
Condit, et al., "Unifying Type Checking and Property Checking for Low-Level Code", retrieved on Sep. 22, 2008 at <<ftp://ftp.research.microsoft.com/pub/tr/TR-2008-96.pdf>>,Microsoft Research, Jul. 2008, pp. 1-13.
de Moura, et al., "Efficient E-matching for SMT Solvers", retrieved on Sep. 22, 2008 at <<http://research.microsoft.com/projects/z3/cade07.pdf>>, Microsoft Research, Automated Deduction—CADE-21, 2007, pp. 183-198, 16 pages.
de Moura, et al., "Yices 1.0: An Efficient Smt Solver", retrieved on Sep. 22, 2008 at <<http://yices.csl.sri.com/slides-afm-tutorial.pdf>>, Computer Science Laboratory, SRI International, 2006, pp. 1-28.
de Moura, et al., "Z3: An Efficient SMT Solver", In Conference on Tools and Algorithms for the Construction and Analysis of Systems, (TACAS), 2008, 4 pgs.
Dijkstra, "Guarded Commands, Nondeterminacy and Formal Derivation of Programs", retrieved on Sep. 22, 2008 at <<http://www.cs.toronto.edu/~chechik/courses05/csc410/readings/dijkstra.pdf>>, ACM, Communications of the ACM, vol. 18, Issue 8, Aug. 1975, pp. 453-457, 5 pgs.
Feng, et al., "An Open Framework for Foundational Proof-Carrying Code", retrieved on Sep. 22, 2008 at <<http://flint.cs.yale.edu/flint/publications/ocaptr.pdf>>, ACM, Proceedings of the 2007 ACM SIGPLAN International Workshop on Types in Languages Design and Implementation, Session 3, 2007, pp. 67-68, 14 pgs.
Filliatre, et al., "Why/Krakatoa/Caduceus Platform for Deductive Program Verification", Springer Berlin/ Heidelberg, Computer Aided Verification, vol. 4590/2007, Aug. 30, 2007, pp. 173-177.
Flanagan, et al., "Extended Static Checking for Java", retrieved on Sep. 22, 2008 at <<http://www.eecs.umich.edu/~bchandra/courses/papers/Flanagan_ESC.pdf>>, ACM, Proceedings of the ACM SIGPLAN 2002 Conference on Programming Language Design and Implementation, Jun. 17-19, 2002, pp. 234-245, 12 pgs.
"Havoc: Heap Aware Verifier fOr C Programs", retrieved on Sep. 22, 2008 at http://research.microsoft.com/projects/havoc/, 1 pg.
Hawblitzel, et al., "Low-Level Linear Memory Management", retrieved on Sep. 22, 2008 at <<http://www.diku.dk/topps/space2004/space_final/hawblitzel-wei-huang-krupski-wittie.pdf>>, Department of Computer Science, Dartmouth College, In Space 2004, 17 pgs.
Henzinger, et al., "Lazy Abstraction", retrieved on Sep. 22, 2008 at <<http://mtc.epfl.ch/~tah/Publications/lazy_abstraction.pdf>>, ACM, Proceedings of the 29th ACM SIGPLAN-SIGACT Symposium on Principles of Programming Languages, 2002, pp. 58-70, 13 pgs.
Hohmuth, et al., "The Semantics of C++Data Types: Towards Verifying low-level System Components", retrieved on Sep. 22, 2008 at <<http://os.inf.tu-dresden.de/vfiasco/types-tphols-2003-a4.ps>>, Dresden University of Technology, Jul. 3, 2003, pp. 1-18.
Jackson, et al., "Using SMT Solvers to Verify High-Integrity Programs", retrieved on Sep. 22, 2008 at <<http://homepages.inf.ed.ac.uk/pbj/papers/afm07.pdf>>, ACM, Automated Software Engineering, Proceedings of the Second Workshop on Automated Formal Methods, 2007, pp. 60-68, 9 pgs.
Jim, et al., "Cyclone: A Safe Dialext of C", retrieved on Sep. 22, 2008 at <<http://www.cs.umd.edu/projects/cyclone/papers/cyclone-safety.pdf>>, AT&T Labs Research, Cornell University, 2002, 14 pgs.
Lahiri, et al., "Back to the Future: Revisiting Precise Program Verification using SMT Solvers", retrieved on Sep. 22, 2008 at >>ftp://ftp.research.microsoft.com/pub/tr/TR-2007-88.pdf>>, Microsoft Research, Technical Report MSR-TR-2007-88, Nov. 7, 2007, Publisher: Association for Computing Machinery, Inc., Principles of Programming Languages, POPL 2008, 16 pgs.
Leroy, "Formal Certification of a Compiler Back-End or: Programming a Compiler with a Proof Assistant", retrieved on Sep. 22, 2008 at <<http://gallium.inria.fr/~xleroy/publi/compiler-certif.pdf>>, ACM, Conference Record of the 33rd ACM SIGPLAN-SIGACT Symposium on Principles of Programming Languages, 2006, pp. 42-54, 13 pgs.
Morrisett, et al., "From System F to Typed Assembly Language", retrieved on Sep. 22, 2008 at <<http://citeseerx.ist.psu.edu/viewdoc/summary?doi=10.1.1.24.6526>>, ACM Transactions on Programming Languages and Systems, 1999, Publisher: Cornell University, Technical Report: TR97-1651, 1997, 41 pgs.
Necula, et al., "CCured: Type-Safe Retrofitting of Legacy Software", retrieved on Sep. 22, 2008 at <<http://delivery.acm.org/10.1145/1070000/1065892/p477-necula.pdf? key1=1065892&key2=0639612221&coll=GUIDE&dl=GUIDE&CFID=3779154&CFTOKEN=6508432>>, ACM Transactions on Programming Languaages and Systems, vol. 27, Issue 3, May 2005, pp. 477-526.
Necula, "Proof-Carrying Code", retrieved on Sep. 22, 2008 at <<http://delivery.acm.org/10.1145/270000/263712/p106-necula.pdf?key1=263712&key2=4832712221&coll=GUIDE&dl=GUIDE&CFID=3703655&CFTOKEN=16206432>>, ACM, Proceedings

(56) References Cited

OTHER PUBLICATIONS of the 24th ACM SIGPLAN-SIGACT Symposium on Principles of Programming Languages, 1997, pp. 106-119.

Necula, et al., "Retrospective: The Design and Implementation of a Certifying Compiler", retrieved on Sep. 22, 2008 at <<http://www.cs.berkeley.edu/~necula/Papers/certcomp_retrospective.pdf>>, ACM, 20 Years of the ACM/SIGPLAN Conference on Programming Language Design and Implementation (1979-1999): A Selection, 2003, 2 pgs.

Nelson, et al., "Simplification by Cooperating Decision Procedures", retrieved on Sep. 22, 2008 at <<http://citeseerx.ist.psu.edu/viewdoc/summary?doi=10.1.1.104.2828>>, ACM, ACM Transactions on Programming Languages and Systems, vol. 1, Issue 2, Oct. 1979, pp. 245-257.

Reynolds, "Separation Logic: A Logic for Shared Mutable Data Structures", IEEE Computer Society, 17th Annual IEEE Symposium on Logic in Computer Science, 2002, 20 pgs.

Rondon, et al., "Liquid Types", ACM, ACM SIGPLAN Notices, Session VI, vol. 43, Issue 6, Jun. 2008, pp. 159-169.

Schulte, et al., "A Glimpse of a Verifying C Compiler—Extended Abstract", retrieved on Sep. 22, 2008 at <<http://www.cs.ru.nl/~tews/cv07/cv07-smans.pdf>>, Source: Radboud University Nijmegen, Computing Science Department, Publisher unknown, 2008, 4 pgs.

SMT-LIB, The Satisfiability Modulo Theories Library, website retrieved on Sep. 22, 2008 at <<http://goedel.cs.uiowa.edu/smtlib>>, SMT-LIB initiative website, 2 pgs.

"The Coq proof assistant", website retrieved on Sep. 23, 2008 at <<http://coq.inria.fr/coq1-eng.html>>, pp. 1-3.

"Windows Driver Kit (WDK)—Overview", website retrieved on Sep. 23, 2008 at <<http://www.microsoft.com/whdc/devtools/wdk/default.mspx>>, Microsoft, pp. 1-2.

Xi, et al., "Dependent Types in Practical Programming", ACM, Proceedings of the 26th ACM SIGPLAN-SIGACT Symposium on Principles of Programming Languages, 1999, pp. 214-227.

Xi, "Imperative Programming with Dependent Types", retrieved on Sep. 22, 2008 at <<http://citeseerx.ist.psu.edu/viewdoc/summary?doi=10.1.1.41.2405>>, University of Cincinnati, Version of Jan. 25, 2000, 14 pgs.

Yang, et al., "Scalable Shape Analysis for Systems Code", retrieved on Sep. 22, 2008 at <<http://www.docic.ac.uk/~ccris/ftp/cav08.pdf>>, 2008, 14 pgs.

* cited by examiner

UNIFYING TYPE CHECKING AND PROPERTY CHECKING FOR LOW LEVEL PROGRAMS

BACKGROUND

Despite the availability of safe, high level languages, many of the most critical software systems are still written in low level programming languages such as C and C++. Although these low level programming languages are very expressive and can be used to write high performance code, such low level programming languages typically do not enforce type and memory safety. This makes low level programming languages much less robust and much more difficult to analyze than higher level languages.

Existing approaches to analyzing low level programs have included type checking and property checking. These approaches have encountered a number of problems and challenges. Type checking for lower level code is difficult because type safety often depends on subtle, program specific invariants. Although previous low level type systems can be quite expressive, they are typically designed for a fixed set of programming idioms and are hard to adapt to the needs of a particular program. Typical low level programs allow for declaring types, but such an approach does not hold the program to those declared types. As such, the program can still be compiled even if the types do not match. Consequently, type checking in low level programs typically checks some types and not others, leaving the program susceptible to errors.

A property checker is a tool for checking assertions over the state of a program. The assertions can be provided by means of preconditions and postconditions on procedures, as well as assumptions and assertions inside the program text.

Property checking tools for low level code can be quite powerful and quite general, but these tools either ignore types for soundness or rely on unproven type safety assumptions in order to achieve the necessary level of precision. For instance, it is difficult to write concise specifications that distinguish between locations in an untyped program's heap.

Consequently, there is a need for a sound and reliable approach for checking low level code.

SUMMARY

This document describes a unified type checker and property checker for a low level program's heap and its types. The type checker can use the full power of the property checker to express and verify subtle, program-specific type and memory safety invariants well beyond what the native type checker of the low level programming language can check. Meanwhile, the property checker can rely on the type checker to provide structure and disambiguation for the program's heap, enabling more concise and more powerful type-based specifications. This approach can make use of a fully-automated Satisfiability Modulo Theories (SMT) solver and a decision procedure for checking type safety. Typically, the programmer's only duty is to provide high-level type and property annotations as part of the original program's source; however, generation of annotations can be automated as well.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE CONTENTS

The detailed description is described with reference to accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
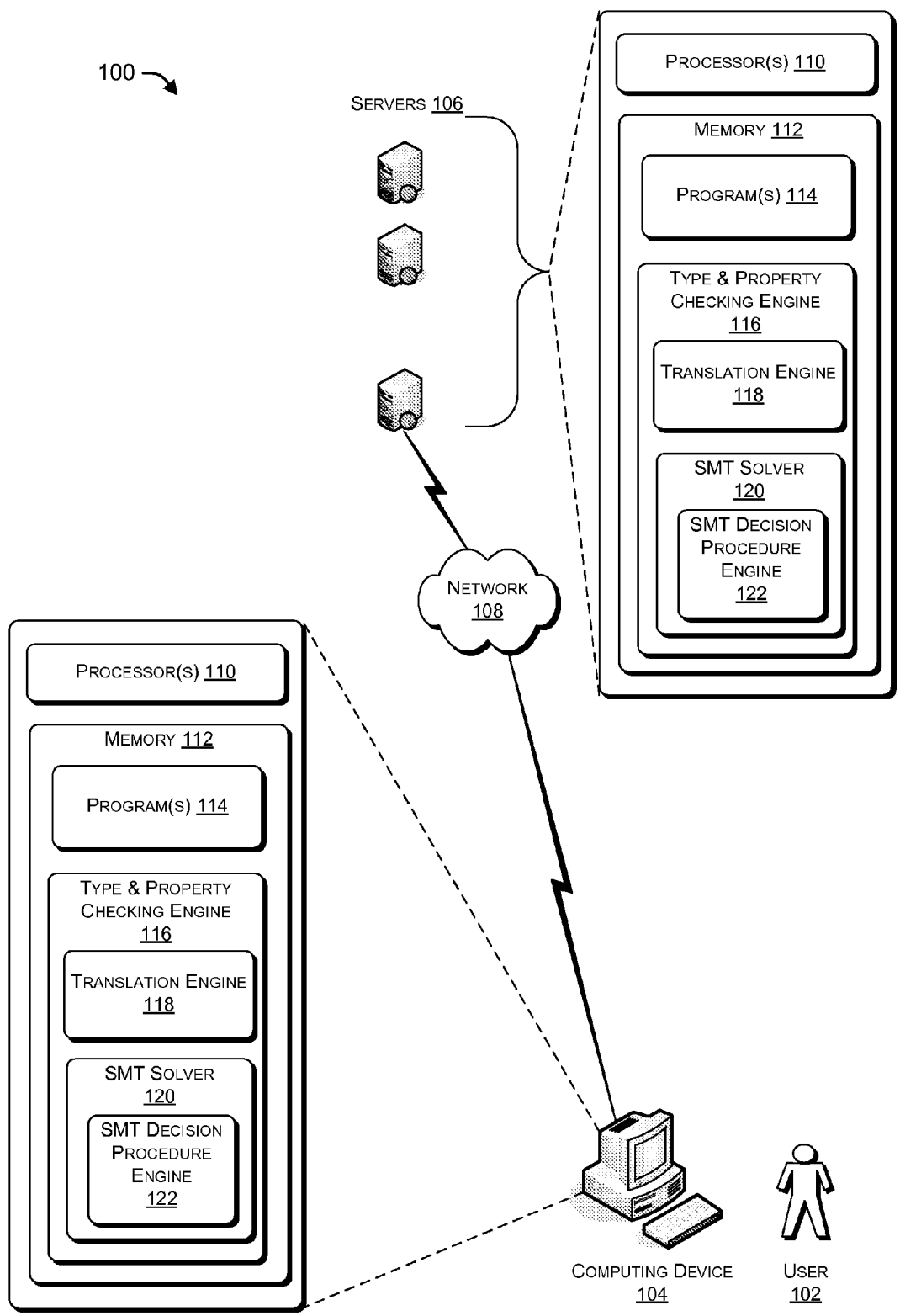
FIG. 1 depicts an illustrative architecture for a unifying property checker and type checker for a low level program.

This document describes a unified type checker and property checker for low level programs, such as C and C++. Typically, low level program code has been difficult to check for bugs and errors. However, despite this shortcoming, low level program code is still very prevalent since it is very versatile and powerful. The techniques described herein provide for a unified type and property checker that provides a much more robust method of improving both the accuracy and the efficiency of checking low level program code.

In some embodiments, a programmer may begin by inserting annotations into low level program code. These annotations may take the form of preconditions and postconditions on functions as well as assertions and assumptions within the program itself. Among other things, these annotations may provide more precise type information than the original program contained. They may also describe properties of the program that the programmer wishes to verify. Although annotations are often provided directly by the programmer, they can also be generated automatically by a separate program.

Given a low level program, possibly with annotations, this program may be translated into a low-level logical representation (in a language such as Boogie Programming Language (BPL)) that explicitly defines the program's semantics and the properties that the user would like to check. The translation automatically inserts additional assertions that verify that type safety is preserved after every operation performed by the programmer. Once this low-level logical representation has been produced, a solver for this logic (such as a Satisfiability Modulo Theories (SMT) solver) can be used to check the assertions in this code. A decision procedure for the type safety assertions is provided. This decision procedure can be used by an SMT solver to verify type safety assertions efficiently. Translation and verification can be completely automated.

In some instances, the SMT solver verifies the type safety assertions, at which point the program is determined to be free of type safety errors. In other instances, the SMT solver fails to verify the type safety assertions, at which point a potential error is found. When a potential error is found, the process may inform a programmer, who may then take action to rectify the problem.

In an embodiment, Boogie Programming Language (BPL) is used as the low-level logical representation; however, any suitable output language or intermediate representation can be used. An intermediate representation may include data stored in memory, a text file or any other similar type file. Likewise, in an embodiment, a Satisfiability Modulo Theories (SMT) solver is used to verify the assertions in the low-level logical representation. However, any technique that can be used to prove the validity of a logical formula may be used. Satisfiability solvers (of which an SMT is merely one illustrative type) typically implement these techniques.

A logical representation of a program that can be used to encode the program's precise low-level semantics as well as the meaning of its types and its type safety invariant is now described. This logical representation models the low level program's heap using two maps that represent the data in the program's heap and the types at which each heap location was allocated. The two maps are:

Mem: int→int
Type: int→type

For example, given an integer address a, Mem[a] is the value stored in memory at address a, and Type[a] is the type that has been declared for that memory location. The checker also defines a predicate called HasType. Given an integer value v and a type t, HasType(v, t) indicates whether a given value corresponds to a given type. The HasType predicate is also used to state the type safety invariant for the heap. The type safety invariant for the heap may be:

∀a:int.HasType(Mem[a],Type[a])

This invariant states that every memory location is well-typed; that is, the value at memory location a corresponds to the type declared for memory location a, according to the predicate HasType.

A type safety invariant (such as the one shown above) is inserted at each point in the program. By asserting and checking this type safety invariant at each program point, the property checker can be used to verify type safety in a flow sensitive and path sensitive manner. A decision procedure for these type safety assertions is also provided.

This low level representation of types and type safety has many benefits. For instance, the programmer can provide additional information about program specific type invariants using the language of the property checker. The programmer is also allowed to define custom types as appropriate for a given program. The types stored in the Type map can be refined in order to identify and distinguish structure fields that are important for checking higher level properties of the code. This allows for effectively choosing between a nominal and a structural definition of type equivalence on a per structure basis. Finally, since the meaning of types are encoded directly in the translated program instead of relying on rules for deriving type judgments, a complex, offline proof of soundness is not required. Many additional benefits are also possible.

The Heap Aware Verifier for C programs (HAVOC™) property checker may also be used in the unified type and property checker system. This system allows for the checking of complex spatial type and memory safety properties (i.e., safety in the presence of pointer arithmetic, casts, and linked data structures) that previous tools were incapable of expressing or checking. The property checker is capable of exploiting concise, type based annotation in proving properties of low level code.

Illustrative Architecture

FIG. 1 depicts an illustrative architecture 100 that may employ the unified property checker and type checker techniques. As illustrated, FIG. 1 includes a user 102 operating a computing device 104. FIG. 1 illustrates computing device 104 as a personal computer, although other embodiments may employ laptop computers, mainframe computers and the like. The user may also operate servers 106 through a network 108.

Computing device 104 contains processors 110 and memory 112. Memory 112 may contain a program or programs 114. For simplicity, a single program will be discussed with respect to FIG. 1. Program 114 is typically a low level program or input program, the most common being programs in languages such as C and C++. The program 114 is sent to a type and property checking engine 116. Initially, the translation engine 118 translates the program 114 to an output language or intermediate representation or logical representation that explicitly encodes the program's semantics and the program's type safety invariant. There are several output languages that can be used depending on the particular circumstances, such as Boogie Programming Language (BPL). Finally, the process reaches the SMT solver 120 or any other solver for logical formulas, which attempts to prove the validity of the program's type safety assertions (as well as any other assertions the programmer may have added). The SMT solver 120 contains an SMT decision procedure engine 122 where the formula is used to check type safety assertions and determine whether the property check and type safety checks have been verified or whether potential errors exist.

While the description above has centered on computing device 104 operating the program 114, other embodiments may also be contemplated. For instance, the entire process may be conducted on servers 106 and then transmitted to the user 102 for corrective action and analysis. Servers 106 may also be used to backup the information generated to create a redundancy and insure that the information will not be lost.

Illustrative Diagram

Figure 2:
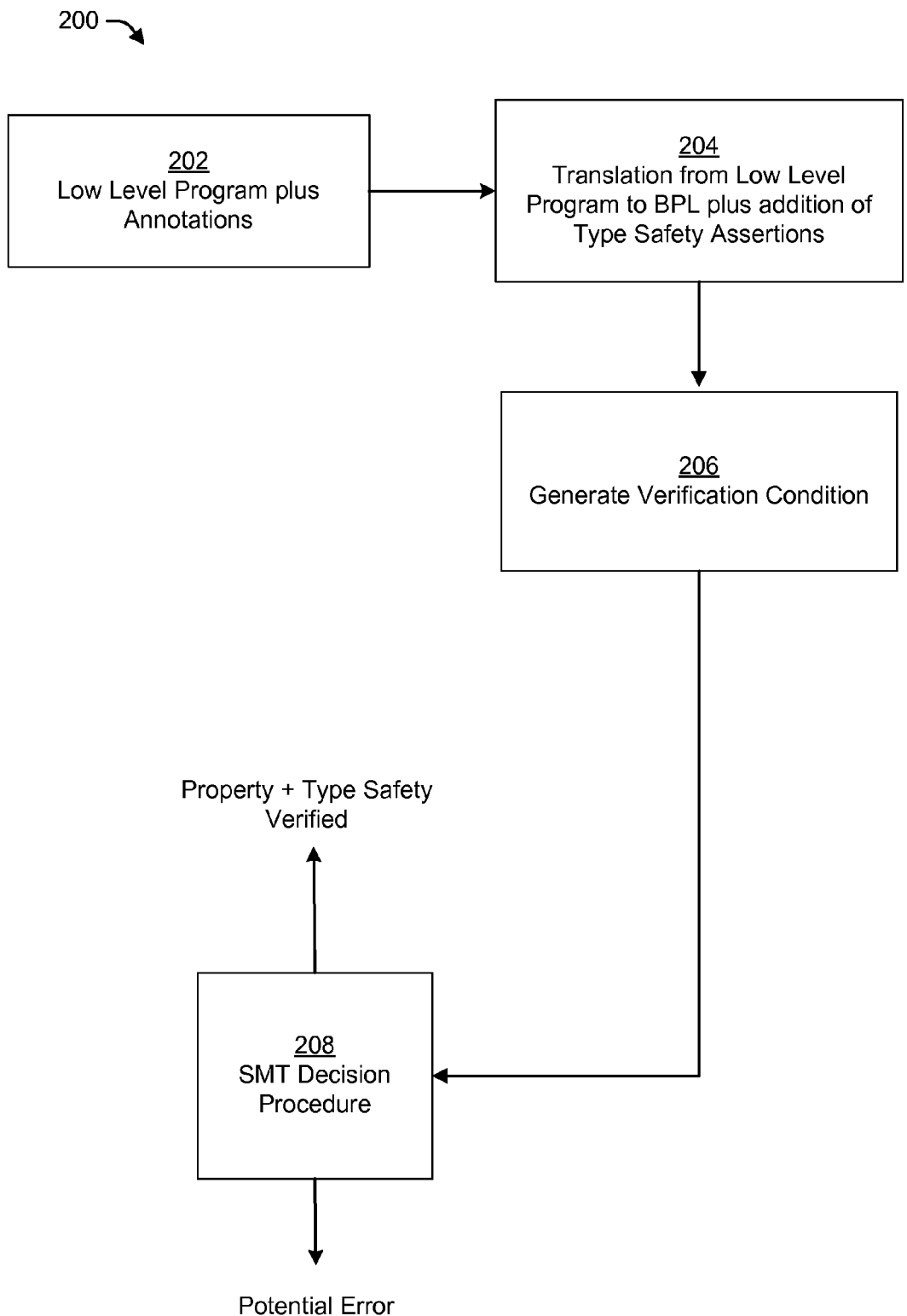
FIG. 2 depicts a block diagram for performing a unified checking technique.

FIG. 2 depicts a process 200 for conducting unified property and type checking for programs written in low level code or input program code. Process 200 is illustrated as a diagram which represents a sequence of operations that can be implemented in hardware, software, or a combination thereof. In the context of software, the operations represent computer-executable instructions that, when executed by one or more processors, perform the recited operations. Generally, computer-executable instructions include routines, programs, objects, components, data structures, and the like that perform particular functions or implement particular abstract data types.

At operation 202, the process identifies a program that is written in low level code, such as C or C++. At operation 202, a programmer may also insert or associate annotations with the program that (among other things) serve to more precisely define the types that are already present in the original program. The annotations are constructed such that they can be translated into an output language or other intermediate representation and be utilized in the checking and verification process.

At operation 204, the program and annotations are translated and type safety assertions are incorporated in the translation. In some embodiments, Boogie Program Language (BPL) is used as the output language.

Modeling Type Safety

The core of the translation involves the maps Mem and Type shown above. Mem models the low level program's heap as a mapping from integer addresses to integer values, and Type models the program's allocation state as a mapping from integer addresses to types. The translation enforces type safety by explicitly asserting the type safety invariant at every program point. The type safety invariant is:

∀a:int.HasType(Mem[a], Type[a])

This type safety invariant says that for every address a in the program's heap, the value at Mem[a] corresponds to the type at Type[a] according to the predicate HasType. This type safety invariant can also be extended to local variables by saying that for all locals x with compile-time type $\tau_x$, then HasType(x, T($\tau_x$r)) must hold, where T is the translation from C types to BPL terms.

This type safety invariant is defined using the predicates Match and HasType:

Match: (int×type)→bool
HasType: (int×type)→bool

As described earlier, the Match predicate lifts Type to types that span multiple addresses. Formally, for address a and type t, Match(a, t) holds if and only if the Type map starting at address a matches the type t. The HasType predicate gives the meaning of a type. For a word-sized value v and a word-sized type t, HasType(v, t) holds if and only if the value v has type t.

The translation models low-level program (e.g., C, C++, etc.) types by defining nullary type constructors Int, T1, T2, and so on, where Int corresponds to the built in integer type, and T1, T2, and so on correspond to user-defined types (e.g., structure or union types) in the program. The unary type constructor Ptr is also defined and is used to construct pointer types such as Ptr(Int). Each type expression created by applying these constructors has a unique value.

Some of these type constants represent types that consume one word in memory, such as Int and Ptr(t), and others consume more than one word in memory, such as structure types. Since Type gives the type for each individual word in memory, a new predicate, Match(a, t) is defined that holds if and only if the values of Type starting at address a match the layout of type t. In other words, Match lifts Type to types that may span multiple addresses.

If it is assumed (for simplicity) that integers and pointers span only a single address in the heap, then Match for integers and pointers simply checks that Type has the appropriate value at address a. For structure types that span more than one word of memory, Match is defined inductively by checking each field of the structure using its declared type. This scheme can also be extended to handle a case where integers and pointers span more than one address in the heap (see below).

Finally, HasType itself can be defined. Under the assumption that HasType only applies to types that span a single address, HasType is only defined for Int and Ptr. For integers, all values are considered valid values of type Int. For pointers, the valid values include zero (the null pointer) and positive heap addresses that match the pointer's base type, as defined by Match. HasType can also be extended to define additional types, if necessary.

If integers and pointers are allowed to span more than one word in the heap, the rules described above can remain the same. The lowest spanned address is used to refer to the entire value, and the translation can ensure that the other addresses spanned by this value are not used inappropriately. See the section on Allocation and Sub-Word Access.

The discussion above formalizes the program's heap, the program's types, and type safety. Next, the method for translating a function into BPL code that asserts type safety at every step is discussed. The translated function contains two preconditions: 1) the type safety invariant holds on entry to the function and 2) any argument variables have their declared type. Likewise, the postconditions state that the type safety invariant holds on exit from the function and that the function's return variable has its declared type.

Variables are declared inside the body of the function corresponding to the variables in the original C or C++ program. The arithmetic and assignments in the C or C++ program are translated into the corresponding operation on local variables and on Mem. All type casts are been eliminated during this translation; however, at every program point, the type safety invariant is re-asserted. This type safety invariant can state that all locations in the heap have their declared types (as shown above), and it can also HasType to assert that all local variables have their declared types.

Translating from C to BPL

Now the translation between the low-level program and an intermediate representation is formally defined. To do so, an illustrative example of the languages used in the translation from a low-level program (e.g., C) to an intermediate representation (e.g., BPL) is given. The example input language, shown below, is a simplified version of the C language, with preconditions and postconditions added to function definitions. The translation defined here may also be used on the full version of the C language.

| | |
|---|---|
| Types(one word) | $\tau ::= \text{int} \mid \sigma *$ |
| Types (general) | $\sigma ::= \tau \mid t$ |
| L-expressions | $l ::= * e \mid l, f$ |
| Expressions | $e ::= x \mid n \mid l \mid \&l$ |
| | $\mid e_1 \text{ op } e_2 \mid e1 \oplus_n e2 \mid (\tau)e$ |
| Commands | $c ::= \mid c_1;c_2 \mid x:=\text{new } \sigma$ |
| | $\mid x:=f(e) \mid x:=e \mid l:= e$ |
| | $\mid \text{if e then c}$ |
| | $\mid \text{while e do c}$ |
| | $\mid \text{let } x : \tau \text{ in c} \mid \text{return e}$ |
| Type definitions | $d ::= \text{pre } e_1 \text{ post } e_2$ |
| | $f(x :\tau_x):\tau_f= c$ |

The key C features modeled by this language are pointer types, structure types, the address-of operator (&), pointer arithmetic on a pointer to a type of size n ($\oplus_n$), and type casts (($\tau$)e).

There are three primitive types: integer types (int), pointer types ($\sigma$*), and named structure types (t). The non-terminal $\tau$ stands for all types whose run-time representation fits in a single word (integers and pointers), and the non-terminal $\sigma$ represents all types. For simplicity, it is assumed that the size of a word is 1. However, it is feasible to apply this translation to code with larger word sizes.

Next are l-expressions and expressions, which include pointer dereference, field reference, address-of, pointer arithmetic, and casts. L-expressions are expressions that evaluate to locations and can therefore appear on the left-hand side of an assignment. The symbol op represents binary operations, including both arithmetic and boolean operations. Commands include allocation, function call, assignment, and variable declaration.

At the top level are type definitions and procedures. Type definitions allow users to create named structure types that can be referenced within o'. Procedures take a single argument with a word-sized type, and they return a single value with a word-sized type. Procedures are annotated with preconditions and postconditions that use expressions drawn from the same language; postconditions can refer to the return value via a special variable,r.

For the time being, several other C features are omitted, such as scalar types of various sizes (e.g., char, short), union types, function pointers, and memory deallocation. Taking the address of local variables is disallowed in our simplified language; instead, any local variables whose address is taken can be replaced with a heap allocation. Other approaches can model addresses of local variables directly by modeling a stack frame as a sequence of addresses in the heap.

The example output language, BPL, in the preferred embodiment is shown below.

| | |
|---|---|
| Sorts | $\hat{s} ::= \text{int} \mid \text{bool} \mid \text{unit} \mid \text{type}$ |
| | $\mid \hat{s}_1 \times \hat{s}_2 \mid \hat{s}_1 \rightarrow \hat{s}_2$ |
| Expressions | $\hat{e} ::= x \mid x[\hat{e}] \mid n \mid C(\hat{e}_1,..., \hat{e}_n) \mid \hat{e}_1 \text{ binop } \hat{e}_2$ |
| Formulas | $\hat{b} ::= \text{true} \mid \text{false} \mid$ |
| | $\mid P(\hat{e}_1,..., \hat{e}_n) \mid \neg \hat{b} \mid \hat{b}_1 \wedge \hat{b}_2 \mid \forall x : \hat{s}.\hat{b}$ |
| Commands | $\hat{b} ::= \text{skip} \mid \hat{c}_1;\hat{c}_2$ |
| | $\mid x := \text{call } f(\hat{e}) \mid x := \hat{e} \mid x[\hat{e}_1] := \hat{e}_2$ |
| | $\mid \text{if } \hat{e} \text{ then } \hat{c} \mid \text{while } \hat{e} \text{ do } \hat{c}$ |

| | |
|---|---|
| Procedures | $\hat{p}$ ::= pre $\hat{b}_1$ post $\hat{b}_2$<br>$\quad\quad\quad$ \| let x : $\hat{s}$ in $\hat{c}$ \| return $\hat{e}$<br>$\quad\quad\quad$ \| assert $\hat{b}$ \| assume $\hat{b}$ \| havoc x<br>$\quad\quad\quad$ fun f(x : $\hat{s}$) : $\hat{s}$ = $\hat{c}$ |

BPL has four built-in sorts: 1) int, which represents values in the original low level program or C program, 2) type, which represents types in the original C program, 3) bool, which represents formulas, and 4) unit, which is used by functions that do not return a value. The most important of these sorts are int and type.

Expressions in BPL are of sort int or type, and include variable reference, map lookup (x[ê]), integer constants (n), type constructors (C), and binary operations on integers. Type constructors (C) typically include nullary type constants such as Int as well as the unary type constructor Ptr.

Formulas are of sort bool and contain relational operators on integers, predicate symbols (P), negation, conjunction, and universal quantification. Predicate symbols P typically include HasType and Match, which are used to define the notion of type safety.

Commands contain assignment and control flow, plus assume $\hat{b}$, assert $\hat{b}$, and havoc x, the latter of which scrambles the value of x.

The most important differences between C and BPL are twofold. First, BPL has no notion of heap allocation. Thus, the C heap is modeled as a map Mem from integer addresses to integer values, and select-update reasoning is used to model reads and writes to the heap. Second, BPL has no notion of pointer types or structure types. Instead, BPL provides the sorts int and type, which are used to represent the original program's values and types, respectively. That is, all word-sized values in the original program map to values of sort int, and all C types in the original program map to values of sort type.

The following shows the translation from C to BPL.

| | |
|---|---|
| T(int) = | Int |
| T($\tau$ *) = | Ptr(T($\tau$)) |
| T(t) = | T |
| L(* e) = | E(e) |
| L(l.f) = | L(l) + Offset(f) |
| E(x) = | x |
| E(n) = | n |
| E(l) = | Mem[L(l)] |
| E(&l) = | L(l) |
| E($e_1$ op $e_2$) = | E($e_1$) op E($e_2$) |
| E($e_1 \oplus_n e_2$) = | E($e_1$) + n * E($e_2$) |
| E(($\tau$) e) = | E(e) |
| C($\Gamma$, skip) = | skip |
| C($\Gamma$, $c_1$; $c_2$) = | C($\Gamma$, $c_1$); C($\Gamma$, $c_2$) |
| C($\Gamma$, x := new $\sigma$) = | havoc x;<br>assume HasType (x, Ptr(T($\sigma$))) |
| C($\Gamma$, x := f(e)) = | x := call f(E(e));<br>assert HasType (x, T($\tau_f$)) |
| C($\Gamma$, x := e) = | x := E(e);<br>assert HasType (x, T($\Gamma$(x))) |
| C($\Gamma$, l := e) = | Mem[L(l)] := E(e);<br>assert $\forall$a: int. HasType (Mem[a], Type[a]) |
| C($\Gamma$, if e then c) = | if E(e) then C($\Gamma$, c) |
| C($\Gamma$, while e do c) = | while E(e) do C($\Gamma$, c) |
| C($\Gamma$, let x: $\tau$ in c) = | let x: int in C($\Gamma$[x$\mapsto\tau$], c) |
| C($\Gamma$, return e) = | return E(e) |
| $P\left(\begin{array}{c}\text{pre } e_1 \text{ post } e_2\\f(x: \tau_x): \tau_f = c\end{array}\right) =$ | pre (E($e_1$) $\wedge$ HasType (x, T($\tau_x$)) $\wedge$<br>$\quad\quad\forall$a: int. HasType (Mem[a], Type[a]))<br>post (E($e_2$) $\wedge$ Hastype (r, T($\tau_f$)) $\wedge$<br>$\quad\quad\forall$a: int. HasType (Mem[a], Type[a]))<br>fun f(x: int): int = C ($\emptyset$[x$\mapsto\tau_x$], c) |

This translation converts C to BPL using several maps. The T map converts C types to their BPL representation. C integers are represented as the BPL value Int. C pointers are represented by the BPL value Ptr(t), where t is the BPL representation of the pointer's base type. Named C types (for example, structures) are mapped to a unique BPL value for that type; for example, a C type named "list" may have a corresponding BPL value called "List".

The E and L maps convert expressions and l-expressions to the corresponding BPL structures. Recall that l-expressions evaluate to the location of a value in the heap and appear on the left-hand side of an assignment. Thus, L(*e) should give the location of the value *e, which is the value of the pointer e itself. L(l.f) handles field offsets by adding the offset of field f to the location L(l). (It is assumed that field names are unique; if they are not, they can be made unique by the compiler.) Normal expressions are handled with the E map. For variables x and integers n, E(x) and E(n) are x and n, respectively. For an l-expression l, E(l) is Mem[L(l)]; that is, since L(l) represents the location of l in memory, the location in memory must be looked up to get the actual value stored at that location. The address-of operator allows us to the get the location itself, so E(&l) is L(l), without the lookup in Mem. Binary operators op are converted to their BPL equivalent; note that the resulting operator may be in "binop" or in "relop" in the BPL language definition. Pointer arithmetic ($\oplus_n$) is converted to standard BPL arithmetic, and type casts are discarded. For an example of this translation, consider the C assignment *x:=&y→f+42, which can be expanded to *x:=&((*y).f)+42. This translation would yield the BPL code Mem[x]:=y+Offset(f)+42. That is, the heap is updated at location x with the value y+Offset(f)+42, which is exactly what the original C code would do.

Finally, the C map converts commands c to their BPL equivalent. The C map takes an additional argument $\Gamma$, which represents the C-language type of each variable in scope; for example, $\Gamma$(x) gives the type of the variable x. Also, it is assumed that $r_f$ is the declared return type of function $f$ and that the variable r in a postcondition refers to the function's return value. Ignoring the portions of the translation in gray boxes, a straightforward conversion from the original C-language program to the corresponding BPL program is obtained. Since BPL does not have dynamic memory allocation, allocation (x:=new $\sigma$) is handled by scrambling the value in x (havoc x), which conservatively models the effect of this allocation.

The portions of the translation in gray boxes represent the assertions and assumptions that are automatically inserted in order to enforce type safety. When entering a function, the precondition assumes that the values of all arguments are well-typed and that the heap is well-typed. On allocation, it is assumed that the allocation yields memory of the correct type. And on every update (and in the function postcondition), the type safety invariant is asserted on local variables and on the heap.

The most important parts of this translation are as follows. First, the C program's heap and types using the Mem and Type maps are explicitly modeled. Second, the assertions about HasType are added, which ensure that the values in the heap (Mem) and in local variables correspond to their declared types (located in Type for heap locations and in $\Gamma$ for local variables).

In order to complete this translation, BPL definitions must be provided for Match and HasType based on the C definitions of each type in the program. Recall that Match(a, t) compares the Type map starting at address a to the layout of type t; that is, it determines whether a value of type t can be stored in memory starting at address a. Also recall that HasType(v, t) determines whether the value v is a valid value for a word-sized type t. The definitions are as follows:

Definitions for Int $$\text{Match}(a, \text{Int}) \stackrel{\Delta}{=} \text{Type}[a] = \text{Int} \quad (A)$$

$$\text{HasType}(v, \text{Int}) \stackrel{\Delta}{=} \text{true} \quad (B)$$

Definitions for Ptr(t)

$$\text{Match}(a, \text{Ptr}(t)) \stackrel{\Delta}{=} \text{Type}[a] = \text{Ptr}(t) \quad (C)$$

$$\text{HasType}(v, \text{Ptr}(t)) \stackrel{\Delta}{=} v = 0 \lor (v > 0 \land \text{Match}(v, t)) \quad (D)$$

Definitions for type $t = \{f_1:\sigma_1; \ldots ; f_n:\sigma_n\}$ $$\text{Match}(a, T) \stackrel{\Delta}{=} \land_i \text{Match}(a + \text{Offset}(f_i), T(\sigma_i)) \quad (E)$$

For integers, there is a BPL constant called Int. Since integers are one-word types, the Match(a, Int) predicate simply looks at Type[a] to determine whether the location a has type Int. Since all values are valid integers, HasType(v, Int) is always true. For pointers, there is a BPL constant Ptr(t) for each base type t. The Match predicate is defined in a manner similar to integers. However, HasType(v, Ptr(t)) is more complicated—v must either be 0 (a null pointer) or an address that matches base type t (according to Match). Finally, there is a definition for a multi-word structure type t. The definition of Match compares each field of the structure in sequence. There is no HasType definition for t, since HasType only applies to word-sized values.

Returning again to FIG. 2, operation 204 represents the translation to BPL described above. In operation 206 a verification condition is generated from the intermediate representation (e.g., BPL). The verification condition is a logical formula that is valid if and only if the assertions in the program hold. Once generated, this verification condition can be passed to a solver (e.g., an SMT solver) in order to determine whether the formula does or does not hold. Finally, in operation 208, a solver (e.g., an SMT solver) is used to verify and check the verification condition. If the assertions are verified, the program is validated and can be used for its intended purpose. If the assertions are not verified, then operation 208 indicates the existence of a potential error and the program is sent back to the programmer or some other qualified user for revision and correction.

Field Sensitivity

In addition to proving type safety for the input program, properties are checked that are specified by the user as preconditions and postconditions for each function. Property checking in the presence of heap-allocated structures often requires us to be able to distinguish between two fields of a structure.

The approach to this problem is to introduce a new type constant for every word-sized structure field in the program. In effect, the types stored in Type are refined so that they capture information about specific structure fields in addition to the types of those fields. For example, if a structure contains two fields named data1 and data2, the translation can introduce constants Data1 and Data2, which are used in the Type map to correspond to the data1 and data2 fields. The definition of HasType for these fields is the same as that of the underlying type, Int, which means that the type safety invariant provides the same amount of information about the values stored in these fields as it did before. However, because the Type map now differs for these two fields, the property checker knows that the data1 and data2 fields of two different structures cannot overlap in memory.

Using this field-sensitive translation involves a trade-off between precision and flexibility. On the one hand, field sensitivity provides a stronger invariant to the theorem prover, which can often be useful in distinguishing one heap location from another. On the other hand, field sensitivity restricts the ways in which two C structures can overlap in the heap.

This trade-off corresponds to the trade-off between nominal and structural type systems. In the field-sensitive translation, equivalence between structure types is determined by the name of that structure (or, more precisely, by the names of its fields). In the original field-insensitive translation, equivalence is determined by structure—that is, by the types of the fields alone.

The translation does not require the user to choose field-sensitive or field-insensitive behavior for the entire program. Instead, the programmer is free to choose a field-sensitive or field-insensitive translation on a field-by-field basis. This flexibility is often quite useful when checking C programs, since many C programs use a combination of these two approaches. The majority of structures in C programs are handled using nominal type equivalence, where overlapping structures must be of the exact same named structure type; structural type equivalence is only used in relatively rare cases where the programmer deliberately overlaps two distinct structures types that share a common header. Thus, this implementation uses the more precise and more common field-sensitive translation by default, and it allows the programmer to specify the fields and structures that should be handled using the field-insensitive translation instead.

Illustrative Translation Example

For clarity, an example of a sample translation from a C program to BPL is shown below. The code below is an example of C code containing two record structures in a linked list.

```
struct list    { list *next; list *prev; }
struct record  { int data1; list node; int data2; }
#define container(p) ((record*)((int*)(p)-1))
void init_record(list *p) {
    record *r = container(p);
    r→data2 = 42
}
void init_all_records(list *p) {
    while (p != NULL) {
        init_record(p);
        p = p→next;
    }
}
```

The init_record function computes the pointer r from the pointer p using the container macro.

The translated version of the example C program above using BPL is shown below.

```
let Mem : int → int
let Type : int → type
let ctor int : type
let ctor Ptr : type → type
let ctor List : type
let ctor Record : type
let Match : int × type →: bool Match(a, Int) ≜ Type[a] = Int Match(a, Ptr(t)) ≜ Type[a] = ptr(t)

Match(a, List) ≜

Match(a, Ptr(List))∧ Match(a + 1, Ptr(List))

Match(a, Record) ≜

Match(a, Int)∧ Match (a + 1, List)∧ Match(a + 3, Int)
let HasType : int × type → bool HasType(v, Int) ≜ v = 0 ∨ (v > 0 ∧ Match(v, t))

pre (∀a : int.HasType(Mem[a], Type[a]))
pre(HasType(p, Ptr(List)))
post(∀a int.HasType(Mem[a], Type[a]))
fun init_record(p : int) : unit =
    let r : int in
    r := p−1
    assert ∀a : int.HasType(Mem[a], Type[a]);
    assert HasType(p, Ptr(List));
    assert HasType(r, Ptr(Record));
    Mem[r+3] := 42;
    assert ∀a : int.HasType(Mem[a], Type[a]);
    assert HasType(p, Ptr(List));
    assert HasType(r, Ptr(Record));
```

It should be noted that the third grouping in the translation above that begins with "let Match: int×type→bool," defines the Match predicate. The next grouping that begins with "let HasType: int×type→bool" defines HasType. Finally, the section beginning with "fun init_record(p: int): unit=" is the actual translation of the init_record function. The translation to BPL still retains a basic program structure; however, assertions can now be included to be verified by a property checker, and the program's heap can be modeled explicitly using the Mem map. Note that after each program statement, the heap type safety invariant is asserted as well as the type safety invariant on each local variable. Note also that the definition of Match(a, Record) could be changed to use constants Data1 and Data2 instead of Int if a field-sensitive translation is desired.

Illustrative Processes

Figure 3:
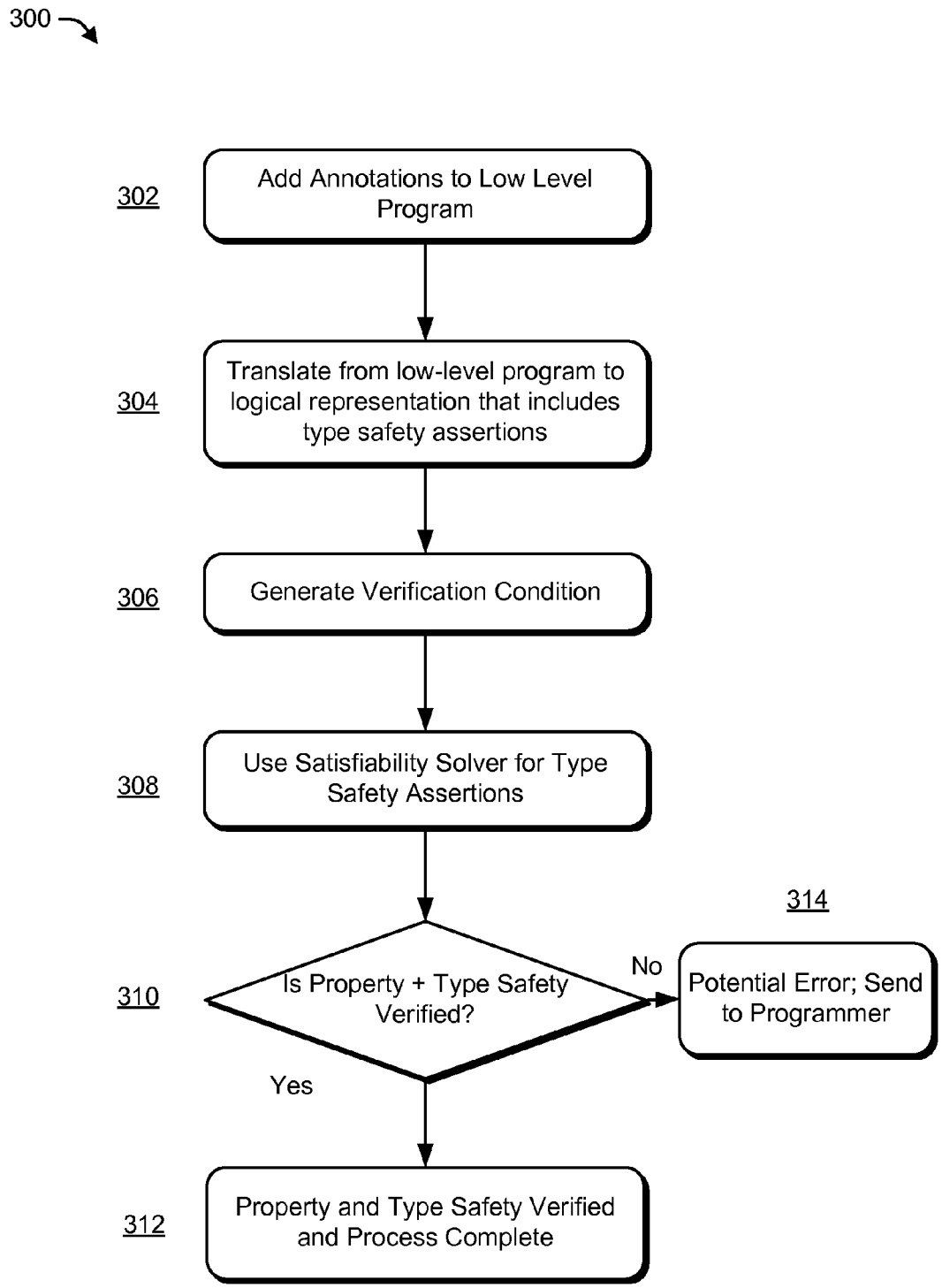
FIG. 3 depicts an illustrative process for performing a unified checking technique.

FIG. 3 depicts an illustrative process 300 for performing a unified checking technique that may be implemented by the architecture of FIG. 1 and/or by other architectures. This process 300 is illustrated as a collection of blocks in a logical flow graph, which represent a sequence of operations that can be implemented in hardware, software, or a combination thereof. In the context of software, the blocks represent computer executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

In operation 302, annotations may be added to a low level program. While the annotations may be optional, these annotations typically enhance the checking and verification process by adding more structure to the types. Operation 304 then translates the low level program including any annotations to an output language or logical representation. Again, the output language may be any language which retains the basic program structure while stripping away the syntax. In an embodiment, BPL language is used. Type safety assertions may be incorporated in the output language translation in operation 304 in order to provide a more robust checking and verification procedure in later operations. A BPL file is created in operation 304 that results from the translation in operation 304.

The BPL file is then used in conjunction with a verification condition generator, such as the Floyd-Hoare verification generator, to generate a verification procedure in operation 306. The verification condition generates a formula. Operation 308 uses an SMT decision procedure or any other technique which validates a verification condition. The decision procedure algorithm performs property checking and type safety checking. Operation 310 determines whether the property checks and type safety checks are verified or determined to be true. If yes, then the checks are deemed verified in operation 312. If the checks are not verified, operation 314 determines that there is a potential error and the program may be sent to the programmer for correction.

Illustrative Decision Procedure Example

After translating C to BPL or another intermediate representation, each of the assertions in the resulting code may be checked by generating a verification condition and then passing it to a solver. Looking at the translation, each problem posed to the SMT solver will have a particular form: given the type safety invariant and the definitions of Match and HasType, all of which are universally quantified, decide whether a given HasType predicate holds. Unfortunately, universally quantified assumptions can cause such a problem to be undecidable, because it is difficult to know how and when to instantiate those assumptions correctly.

For example, one possible assertion is HasType(0, Ptr(Int)), which says that 0 is a valid pointer to an integer. The verification condition generated for this assertion might be a conjunction of the assertion itself along with the type safety invariant (i.e., ∀a:int.HasType(Mem[a],Type [a]))) and universally-quantified HasType and Match definitions (e.g., ∀v: int.∀t:type.HasType (v,Ptr(t))⇔v=0 ∨ (v>0 ∧ Match(v,t)), which is derived from definition (D))). In order to prove this verification condition, the second example should be instantiated on v=0 and t=Ptr(Int), which allows us to prove that HasType(0, Ptr(Int)). However, it is difficult to determine, in general, when and how to instantiate all of these universally-quantified axioms. If one were to simply guess instantiations for these axioms, it might take a very long time to happen upon the instantiations needed to prove the verification condition. Even worse, if given an invalid verification condition, one might never be able to disprove it, because one might never know when enough instantiations have been tried.

This section gives an algorithm for efficiently instantiating all of the available universally-quantified axioms on all terms needed for proving or disproving the verification condition.

This algorithm transforms a potentially unbounded search through the possible ways to instantiate each axiom into a bounded and efficient decision procedure.

This decision procedure is used to check the verification conditions generated from the output of the translation described. The verification condition corresponds to a logical formula that encodes the partial correctness of a loop-free and a call-free code fragment annotated with a precondition and a post-condition, where the annotations can optionally refer to quantifier-free assertions apart from the type safety assertion. Each verification condition is represented by a formula in the logic the following:

```
b ∈ BoolConst = {false, true}
c ∈ IntConst = {..., −1, 0, 1, ...}
t ∈ ITypeConst = {Int, List, Record, ...}
d ∈ TypeConst ⊃ ITypeConst
w ∈ BoolVar
x ∈ IntVar
y ∈ TypeVar
φ ::= b | w | p < p | p − p | Match(p, q) | HasType(p, q) |
      ¬φ | φ∧φ
p ::= c | x | p = p | p − p | Mem[p]
q ::= d | y | Ptr(q) | Type[p]
```

Without loss of generality, it is assumed that updates to Mem have been compiled away by introducing case-splits to model the select-update reasoning for arrays. The logic contains three sorts: bool, int, and type. Terms of these sorts are generated by the non-terminals φ, p, and q, respectively. BoolConst, the set of constants of sort bool and IntConst, the set of constants of sort int are defined in the usual way. ITypeConst is the set of (interpreted) type constants that occur in the program and which are referred to in the definitions of the predicates Match and HasType. For example, ITypeConst={Int, List, Record} and TypeConst is the set of all type constants of sort type and is a countably infinite set that contains ITypeConst.

A formula in the logic is evaluated in a model that provides a domain for each sort bool, int, and type. The domains for the sorts bool and int are standard. The domain for the sort type is the unique infinite set whose elements are in one-to-one correspondence with the least set of terms containing all type constants in TypeConst and closed under the application of Ptr. In this interpretation, each type constant in TypeConst is interpreted as a distinct type value and Ptr is interpreted as a one-one map from type into type whose range is disjoint from the interpretations of the type constants in TypeConst. Let PtrTypeVals=type\TypeConst be the set of all type values that are in the range of Ptr. Let UTypeConst=TypeConst\ITypeConst be the set of (uninterpreted) type constants that do not occur in the program. Then, the disjoint union ITypeConst ⊎ UTypeConst ⊎ PtrTypeVals equals type.

In addition, a model also provides an interpretation for constants, variables, and functions. The interpretation of the arithmetic and Boolean terms is standard. Functions Mem and Type are interpreted as arbitrary maps from int to int and int to type, respectively. Predicates Match and HasType are interpreted as maps from int×type to bool. Given a model Γ, the interpretation of a symbol s is denoted in the signature of the logic as Γ (s). For ease of exposition, s rather than Γ (s) is often used for those symbols, such as +, whose interpretation does not vary from one model to another. A model is well-typed if the following conditions are satisfied:
1. Γ (Match) and Γ (HasType) are consistent with the definitions of Match and HasType.
2. For all ∈ a int, the evaluation of HasType(Mem[a]Type [a]) in Γ returns true.

A Model Satisfies a Formula if Evaluates to True in Γ.

The logic for the verification condition is the quantifier-free combination of three theories—uninterpreted functions, arithmetic, and inductive data types—with disjoint sets of symbols. Each of these theories is stably infinite and individually decidable. A theory is stably infinite if any satisfiable formula in the theory has a countably infinite model. Hence, their combination is also decidable using the Nelson-Oppen method of theory combination. Satisfiability Modulo Theories (SMT) solvers can be used to efficiently check whether there exists a model of φ. However, deciding the existence of an arbitrary model of φ does not suffice; instead it should be determined whether there exists a well-typed model of φ. Conjoining the type-invariant and the definitions of Match and HasType to universally-quantified axioms is unlikely to work well because the performance of SMT solvers on formulas with quantifiers is unpredictable and typically bad. To get good performance, a new decision procedure is designed that conjoins a small number of instantiations of the universally-quantified facts to φ to get a quantifier-free formula ψ with the following property: There is a well-typed model satisfying φ if there is a model satisfying ψ. Thus, it suffices to feed ψ to an SMT solver.

Quantifier Instantiation

This section discusses how to construct ψ. Let P (φ) denote the set containing the constant 0 and every term p in such that for some term q either HasType(p, q) or Match(p, q) is present in φ. Let Q (φ) denote the set containing ITypeConst and every term of the form Ptr(q') in φ. The terms in P (φ) and Q(φ) are used to instantiate the definitions A, B, C, D, E shown below:

Definitions for Int $$\text{Match}(a, \text{Int}) \stackrel{\Delta}{=} \text{Type}[a] = \text{Int} \quad\quad (A)$$

$$\textit{HasType}(v, \text{Int}) \stackrel{\Delta}{=} \text{true} \quad\quad (B)$$

Definitions for $Ptr(t)$ $$\text{Match}(a, Ptr(t)) \stackrel{\Delta}{=} \text{Type}[a] = Ptr(t) \quad\quad (C)$$

$$\textit{HasType}(v, Ptr(t)) \stackrel{\Delta}{=} v = 0 \lor (v > 0 \land \text{Match}(v, t)) \quad\quad (D)$$

Definitions for type $t = \{f_1:\sigma_1; \ldots ; f_n:\sigma_n\}$ $$\text{Match}(a, T) \stackrel{\Delta}{=} \wedge_i \text{Match}(a + \text{Offset}(f_i), T(\sigma_i)) \quad\quad (E)$$

First, each definition E is preprocessed such that every use of Match on the right side of the definition is expanded out by the application of other such definitions. Note that this expansion will terminate because the definition of Match follows the hierarchical structure of types in a C program and is consequently non-recursive. After each definition of Match has been expanded out, the following formulas are conjoined with φ:
1. HasType(Mem[p], Type[p]) for each term Mem [p] in φ.
2. Instantiations of definitions A, B, and E on each term in P(φ).
3. Instantiations of definitions C and D for each term p and q such that p ∈ P (φ) and Ptr(q) ∈ Q (φ).

Let the resulting formula be ψ. Since the size of P (φ) and Q (φ) is bounded by |φ|, at most 2 conjuncts are generated, each of constant size. Therefore |ψ| ∈ O (|φ|²). The resulting formula ψ is equivalent to the original formula φ, but since ψ is quantifier-free, it can be efficiently handled by a solver.

Extensions

A number of optional extensions to the translation are possible that address additional features of the C language or additional requirements for verifying type safety in existing C code.

Unions

C's union types allow fields of several unrelated types to be stored at the same location in memory, with only one such field in use at a given time. Unfortunately, C does not provide any mechanism for keeping track of which field is currently in use, which means that the programmer could easily violate type safety by storing a value in one field and retrieving it from another field of a different type.

The use of unions varies widely from program to program. In some cases, each instance of a given union type uses only one field for the entire lifetime of the union; that is, the dynamic type of the union is fixed at allocation time. In other cases, a given instance of a union type uses many fields over its lifetime, and the dynamic type of that union cannot be fixed at allocation time.

Because the use of unions varies so widely, one possible approach to translating unions is to leave unions completely undefined during translation. That is, the default translation can say nothing about the meaning of HasType or the value of Type for a union type. If the programmer wishes to use unions safely, they must introduce additional assertions that state the appropriate invariants explicitly. For example, consider the following C code:

```
union foo { int n; int *p; }
int getnum(foo * f, tag t) {
    return (t == 1) ? f->n : * f->p;
}
```

In this example, a union containing two types, int and int* is shown, which means that the foo* argument is either an int* or an int**. The default translation does not indicate which field is selected, so the user must specify a precondition on this function, such as:

pre((t==1)==>hastype(f, int*)) && (t !=1)==>hastype(f, int**)))

C's syntax is extended with an implication operator (==>) and a predicate hastype that will be translated into HasType in the input to the theorem prover. This precondition provides enough information to verify that the body of getnum is well-typed.

Other approaches are possible. One alternative is to define HasType and Match using a disjunction. For example, if a union U has two fields of types A and B, then HasType could be defined for a value v such that HasType(v, U) holds if and only if HasType(v, A) or HasType(v, B) holds. Another possibility is to use data outside of the union type to indicate which field is being used by the union at any given time.

Function Pointers

This section discusses one type of extension called function pointers. The translation described above only allows calls to known functions; however, most C programs use function pointers to invoke functions indirectly. Many property checking tools model function pointers by associating each function in the program with a distinct integer value, and then they model function pointer invocation as a case split on the integer representing the function pointer or as nondeterministic choice. However, when checking large C programs, it is often difficult, if not impossible, to know at compile time all functions that might be invoked at a given call site. Instead, this problem is addressed by adding a function type to the language.

The input language is extended with a function type and an indirect function call:

τ::= ... |τ$_1$e$_1$→τ$_2$e$_2$ c::= ... |x::=y(e)

The function type τ$_1$e$_1$→τ$_2$e$_2$ represents a function from type τ$_1$ to type τ$_2$ that has precondition e$_1$ and postcondition e$_2$. Naturally, the precondition e$_1$ can refer to the argument x, and the postcondition e$_2$ can refer to the argument x and the return value r. Note that by allowing the programmer to refer to expressions in function types, a form of dependent type has been introduced. In the indirect call, a function stored in the variable y is invoked.

BPL is extended with a new data type constructor:

Func: (type×int×type×int)→type

The Translation is Extended as Follows:

T(τ$_1$e$_1$→τ$_2$e$_2$)=Func((τ$_1$),φ(E(e$_1$)),T(τ$_2$),φ(E(e$_2$)))

C(Γ,x:=y(e))=x:=call stub$_τ$(E(e))

where y has type τ

The first part of this translation maps an annotated C function type to its BPL representation. The function is a one-to-one function from BPL expressions to integers, which is created by assigning a unique integer to every expression in the program text; this function allows us the precondition and postcondition of a BPL function to be encoded as integer arguments to Func.

The second part of the translation implements a call to a function pointer y by calling the stub corresponding to y. If the type of y is τ=τ$_1$e$_{pre}$→τ$_2$e$_{post}$ then stub$_τ$ is declared as follows:

pre E(e$_{pre}$) ∧ HasType (x, τ$_1$)

post E(e$_{post}$)∧ HasType (r, τ$_2$)

fun stub$_τ$(x: int): int

This stub summarizes the entire class of functions represented by the function type τ$_1$e$_{pre}$→τ$_2$e$_{post}$. Thus, by calling this stub, the preconditions given the argument e$_2$re checked, and the postcondition on the caller's return variable x is assumed. Note that stub$_τ$ itself does not need to be checked; it exists solely to represent function pointer invocations.

A subtle but important point is that the translation of function pointer invocations depends upon the types assigned by the original (unsound) C type system. However, because the declared type of y in the translation is enforced, it can be used to translate this function call.

The final piece of the translation is the HasType and Match axioms for the Func constructor. In order to define HasType, a unique integer is associated with every function in the program. For a given function type Func ( ... ), HasType is defined as the set of integers corresponding to all functions of that type. This set necessarily includes all such functions that are visible in the current compilation unit; however, it is not limited to those functions, since a function of that type may be called in a different compilation unit. For Match, a definition is provided that corresponds directly to the definitions for other word-sized types, since the function type is itself a word-sized type.

By associating preconditions and postconditions with C function types, and by using these preconditions and postconditions in the translation of C function calls, one can correctly translate and type-check C programs that use function pointers, even without knowing all possible values for every function pointer.

Parametric Polymorphism

Many existing C programs can be more effectively type-checked if the programmer is allowed to indicate code that uses parametric polymorphism. Consider the following example program:

```
typedef void *arg_t; //Type variable!
typedef void (*fn_t)(arg_t a);
void create_thread(fn_t f, arg_t a);
void thread1(int n) {...}
void thread2(foo *p) {...}
foo *p = ...;
create_thread(thread1, 42); //arg_t = int
create_thread(thread2, p); //arg_t = foo*
```

In this example, a function is declared called create_thread that takes two arguments: a pointer to a function that should be executed on the new thread, and an argument to pass to that function. Two additional functions are defined, thread1 and thread2, which represent the main functions for two different threads. Finally, create_thread is invoked on each of these functions with different arguments; one takes an int and the other takes a foo*.

Although the type of arg_t is given as void* in this example, this type is actually being treated as a type variable. That is, for a particular call to create_thread, the programmer can consider arg_t to be any word-sized type, as long as the thread function and its argument have consistent types. This code is an example of how C programmers frequently use concepts from higher-level type systems even in lower-level code.

Polymorphism can be provided by explicitly passing the type for any type variables involved in the function call. For example, the above code would be translated into:

```
pre HasType(f, Func(t,...))
pre HasType(a, t)
fun create_thread(t : type, f : int, a : int) = ...
assume HasType(thread1, Func(Int,...))
assume HasType(thread2, Func(Ptr(Foo),...))
assume HasType(p, Ptr(Foo))
call create_thread(Int, thread1 42)
call create_thread(Ptr(Foo), thread2,p)
```

Note that both calls to create_thread satisfy the two preconditions on the types. In the first call, a function thread1 is passed that has a type whose first argument is Int, and 42 is passed, which can be determined to have type Int according to the HasType axioms. The second call satisfies the preconditions for a similar reason.

The translator can allow the programmer to identify types that should be treated as type variables. When these types appear in the arguments or return types of a function being invoked, the formal types are compared to the actual types to determine an appropriate substitution, and then the substituted types are passed as arguments to the translated function. Similarly, when translating a function with arguments of polymorphic type, a suitable number of formal type parameters are added to the translated function.

As with function pointers, this feature has been found to be quite useful in establishing type safety for existing C code due to examples like the one above. This example is particularly noteworthy because the type invariant allows an important fact to be stated about the arguments to create_thread (i.e., that f will only be called with a as an argument) that would be difficult to state succinctly in a more traditional property checking tool.

Finally, note that the decision procedure can be extended to handle polymorphic types by treating the type variable t as a new, opaque type constant.

User-Defined Types and Dependent Types

In addition to the above extensions, the programmer can be allowed to introduce new type constants with user-provided HasType definitions. For example, a programmer could use this feature to define a non-null type. Although this invariant could also be expressed by writing preconditions and post-conditions on functions, it is often convenient to be able to add such global invariants to the type safety invariant, which is implicitly enforced at each program point.

When providing user-defined types, it is often convenient to have HasType depend upon Mem in addition to Type. Types that are defined in this manner can be considered a form of dependent type, since their meaning depends upon values stored in the heap. For example, consider the following structure:

struct string {char*buf; int len;}

This structure represents a string, where len is the number of characters appearing in char. However, the default type definition does not express this invariant:

$$HasType(v, Ptr(String)) \stackrel{\Delta}{=} v = 0 \lor (v > 0 \land Match(v, String))$$

However, if HasType can depend on Mem, a much stronger definition can be written:

$$HasType(v, Ptr(String), Mem) \stackrel{\Delta}{=}$$
$$v = 0 \lor (v > 0 \land Match(v, String) \land \forall i: int.0 \le i <$$
$$Mem[v+1] \Longrightarrow HasType(Mem[v]+i, Ptr(Char), Mem))$$

This new definition is more powerful than the previous one, but it also places an additional burden on the theorem prover, and the programmer must create type definitions that preserve the completeness guarantees.

Allocation and Sub-Word Access

Currently, the translation models memory allocation by scrambling the target variable and assuming the appropriate type. Precision can be improved by introducing two additional maps: Alloc, which keeps track of whether each word of memory has been allocated or deallocated, and Base, which maps each allocated word to the base address for that allocation. These maps provide additional precision for the property checker, and they also allow for expressing and checking temporal type and memory safety properties, such as the lack of dangling pointers.

Another imprecision is the assumption that each word in memory is of size 1. To model a 32-bit machine, the word size can be set to 4 and allow Mem to map byte addresses to values. An additional map, Span, can be maintained in order to keep track of how many byte addresses a given value spans. For example, when writing word-sized values to address a, it is asserted that Span(a)=4 and that Span(a+1)=Span(a+2)=Span(a+3)=0.

Use of the Technicques in Windows®

Several case studies that demonstrate the effectiveness of the technique on real code are presented, including property examples and experiments with type checking in Windows® device drivers.

The combined type and property checking tool are implemented inside HAVOC™, a property checker for C code that plugs into Microsoft's Visual C Compiler®. After HAVOC™ translates C code to BPL, Boogie™ is used to generate a verification condition, which is checked using the Z3™ SMT solver. HAVOC™ previously supported reasoning about linked lists and arrays using SMT solvers.

Property Checking

To evaluate the usefulness of adding types to a property checker, the tool is applied to a set of small to medium-sized C bench-marks in the HAVOC™ regression suite. These examples range between 10 and 100 lines of code, and they include various low-level list algorithms (e.g., adding or removing elements from a doubly linked list, reversing or sorting a list) and various array sorting algorithms (e.g., insertion sort, bubble sort). The list routines use the list structure described above. For each of these examples, partial correctness properties were proved (e.g., bubble sort yields a sorted array, reversing a list preserves the list), in addition to the type safety assertions. In the absence of types, earlier verification of these examples included ad-hoc annotations to obtain disambiguation.

One of the examples list_appl is used to illustrate the benefits of using types in the annotations. The example (about 100 lines) contains two circular doubly-linked lists hanging off a parent object; each node in the two lists has a pointer to the parent. The objects in the two lists have distinct C types and have different data structure invariants. The example performs various operations such as initialization, insertion/deletion from the lists, and updating the data values in the lists. The data structures in the example are fairly representative of low-level systems code.

The main challenge in this example is to preserve the global invariants of the lists despite updates to the heap. To do so, it must be ensured that the set of addresses in the two lists are disjoint, and there must be field-based disambiguation in order to show that certain fields are not updated. Previously, stating these invariants required one to construct a set for the addresses of each of the fields in the two lists and specify pairwise disjointness of these sets. These specifications were very cumbersome and required a quadratic number of annotations in the number of fields.

In contrast, the field-sensitive type safety assertion ensures that the fields of two different types do not alias. To state that the two lists are disjoint, an invariant for each list describing the type of the object in which the list is embedded is stated. The specifications are local to each list and hence grow linearly in the number of lists. The conciseness of specification is crucial for verifying larger systems programs where multiple lists hang off a parent object with a few hundred fields.

Device Drivers

The tool was applied to several Windows® device drivers for the purpose of verifying type safety. These device drivers (cancel, event, kbfiltr, and vserial) are publicly-available sample drivers included with the Windows® Driver Kit (WDK) 1.7 that demonstrate several common idioms in Windows® device drivers.

The process of annotating a driver is iterative, much like the traditional edit-compile-debug cycle. The tool was run on the unmodified driver, and annotations were added, new types introduced, or the code was otherwise modified in order to resolve the reported type errors. The WDK header files were also modified where appropriate, and HAVOC™ automatically added non-null assumptions for all pointers. Each conversion took approximately 1-2 hours. The flexibility of the technique described was crucial for checking these drivers successfully. The most prominent example is the LIST_ENTRY structure, which is embedded in structures to form a linked list. This idiom appears commonly in Windows® code, including two of the four drivers tested. The ability to annotate and check these linked lists without specifically customizing the tool for this case was accomplished. This example demonstrates the ability of the technique to capture program-specific invariants that are important for enforcing type safety.

Another common example that demonstrates the usefulness of the technique is the dispatch mechanism that the kernel uses to invoke drivers. A simplified version of the code is as follows:

```
void MyRead(Driver *driver) {
    MyContext *ctx = (MyContext*) driver->ctx;
    ...
}
void MyWrite(Driver *driver) {
    MyContext *ctx = (MyContext*) driver->ctx;
    ...
}
void MyInit(Driver *driver) {
    MyContext *ctx = ...;
    driver->ctx = (void*) ctx;
    driver->read = MyRead;
    driver->write = MyWrite;
}
```

In this example, the driver defines two dispatch routines, MyRead and My Write, and an initialization function, MyInit. Each routine is called with a kernel object of type Driver* representing the driver. This kernel object contains a ctx field of type void* that is used by each driver to store the driver's private data. In the MyRead and MyWrite functions, the driver casts this pointer to a MyContext* in order to access its private data.

It is preferable to prove this cast safe, but one cannot simply add a precondition to MyRead and MyWrite saying that the type of the ctx field is MyContext*, since the caller (i.e., the kernel) does not know about the internals of each driver and could not prove this precondition. In fact, the real precondition for MyRead is driver→read==self, where self is a special keyword representing the current function (i.e., MyRead). In other words, the invariant is that the kernel will only call the driver→read function with driver itself as an argument, which is a common invariant in low-level type systems for object-oriented code. Since it can be proved that driver→read==MyRead, the read field can be used as a tag indicating the run-time type of ctx; that is, a global invariant is added that says that a driver whose read field is MyRead must also have a ctx of type MyContext*.

A final example made use of this technique in the vserial driver. Several complicated routines that read and write buffers of data required preconditions and loop invariants in order to prove that all array references were in bounds. Because the necessary invariants can be expressed directly using the property checker, it did not require any customized type annotations, as other type checking tools would require.

All of the uses described above serve as examples. Our unified type and property checker can be used in many more situations that are not covered above.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A memory coupled to a processor, the memory having stored thereon computer executable instructions causing the processor to execute a process, the process comprising:
translating a program code to a logical representation that includes type-safety assertions by asserting at least one type-safety invariant at one or more program points of the logical representation, wherein the at least one type-safety invariant states that a memory location is well-typed such that a value at the memory location corresponds to a type declared for the memory location, and wherein the type-safety assertions include a portion containing user-defined types input directly into the logical representation, and wherein the translating of the program code comprises translating the program code other than the user-defined types into the logical representation;
generating a verification condition from the translated program code;
if the generated verification condition includes one or more universal quantifiers,
removing the one or more universal quantifiers from the generated verification condition; and
executing a decision procedure to prove or disprove the generated verification condition.

2. The memory according to claim 1, wherein the program code has been written in C or C++.

3. The memory according to claim 1, wherein the logical representation of the program code models values in a heap and models types of heap locations, the values in the heap being modeled using a map from addresses to the values and the types of the heap locations being modeled using a map from the addresses to the types.

4. The memory according to claim 3, wherein the map for the types of the heap locations utilizes unique types for one or more fields of a structure type.

5. The memory according to claim 1, wherein the translating the program code to the logical representation includes asserting the at least one type-safety invariant after every program point by modeling a type-safety invariant for a heap and for local variables, if any.

6. The memory according to claim 1, wherein the program code includes one or more polymorphic types, and wherein the translating of the program code includes translating the one or more polymorphic types of the program code.

7. The memory according to claim 1, further comprising function pointer types added to the logical representation, the function pointer types comprising argument types, return types, preconditions, and postconditions.

8. A method, comprising:
translating, by using a processor, a program code to a logical representation appropriate for input to a theorem prover, wherein the translation encodes type-safety assertions into the program code by asserting at least one type-safety invariant at one or more program points of the logical representation, the at least one type-safety invariant stating that a value at a memory location corresponds to a type declared for the memory location;
annotating a portion of the program code containing user-defined types input into the logical representation, wherein the translating the program code comprises translating the program code other than the user-defined types into the logical representation;
generating a verification condition for the type-safety assertions;
if the generated verification condition includes one or more universal quantifiers,
removing the one or more universal quantifiers from the generated verification condition; and
executing a decision procedure to prove or disprove the generated verification condition.

9. The method of claim 8, wherein the program code includes one or more polymorphic types, and wherein the translating of the program code includes translating the one or more polymorphic types of the program code.

10. The method of claim 8, wherein the logical representation of the program code models values in a heap and models types of heap locations.

11. The method of claim 8, wherein the translating the program code to the logical representation includes asserting the at least one type-safety invariant after every program point by modeling a type-safety invariant for a heap and for zero or more local variables.

12. The method of claim 8, wherein the decision procedure comprises obtaining a new formula by instantiating a type-safety invariant and definitions for a HasType predicate and a Match predicate at a finite set of locations and types, and further comprising checking a satisfiability of the new formula.

13. A system comprising:
a processor;
a memory coupled to the processor, the memory having stored thereon computer executable instructions causing the processor to execute a process;
a translation engine, stored in the memory, to translate the program code to a logical representation appropriate for input to a theorem prover, wherein the translation engine encodes type-safety assertions into the program code by asserting at least one type-safety invariant at one or more program points of the logical representation, the at least one type-safety invariant stating that a value at a memory location corresponds to a type declared for the memory location, and wherein a portion of the program code contains user defined types input directly into the logical representation, and wherein the program code other than the user-defined types is translated into the logical representation;
a generator, stored in the memory, for generating for a verification condition for the type-safety assertions, wherein if the generated verification condition includes one or more universal quantifiers, the one or more universal quantifiers are removed from the generated verification condition; and
a decision procedure engine stored in the memory, to execute a solver to prove or disprove the type-safety assertions.

14. The system according to claim 13, wherein the logical representation of the program code models values in a heap and models types of heap locations.

15. The system according to claim 13, wherein the translating the program code to the logical representation includes asserting the at least one type-safety invariant after every program point by modeling a type-safety invariant for a heap and for local variables, if any.

16. The system according to claim 13, wherein the program code includes one or more polymorphic types, and wherein the translating the program code to the logical representation also includes translating the one or more polymorphic types.

17. The system according to claim 13, wherein executing the solver comprises obtaining a new formula by instantiating a type-safety invariant and definitions for a HasType predicate and a Match predicate at a finite set of locations and types, and further comprising checking a satisfiability of the new formula.

18. The method of claim 1, wherein the decision procedure comprises obtaining a new formula by instantiating a type-safety invariant and definitions for a HasType predicate and a Match predicate at a finite set of locations and types.

* * * * *